United States Patent [19]
Johnson et al.

[11] Patent Number: 5,482,451
[45] Date of Patent: Jan. 9, 1996

[54] APPARATUS FOR THE PREPARATION OF OPTICAL FERRULES

[75] Inventors: Melvin H. Johnson, Chadds Ford, Pa.; Frank M. Willis, Wenonah, N.J.

[73] Assignee: E. I. Du Pont de Nemours, Wilmington, Del.

[21] Appl. No.: 238,100

[22] Filed: May 4, 1994

Related U.S. Application Data

[63] Continuation of Ser. No. 984,796, Dec. 3, 1992, abandoned.

[51] Int. Cl.⁶ .......................... B29C 45/14; B29C 45/36; B29C 45/40
[52] U.S. Cl. .......................... 425/116; 425/117; 425/125; 425/190; 425/556; 425/577; 425/444; 425/468; 425/DIG. 10; 264/1.24; 264/1.26; 249/97
[58] Field of Search ..................... 425/116, 125, 425/117, 577, 190, 192 R, 556, 444, 468, DIG. 10; 264/1.24, 1.25, 1.26; 249/63, 67, 97, 98

[56] References Cited

U.S. PATENT DOCUMENTS

| | | | |
|---|---|---|---|
| 4,026,972 | 5/1977 | Phillips et al. | 264/1 |
| 4,173,389 | 11/1979 | Curtis | 350/96.20 |
| 4,264,128 | 4/1981 | Young | 350/96.20 |
| 4,292,260 | 9/1981 | Cheung | 264/1.5 |
| 4,330,171 | 5/1982 | Malsot et al. | 350/96.20 |
| 4,531,702 | 7/1985 | Plummer | 249/64 |
| 4,553,814 | 11/1985 | Bahl et al. | 350/96.21 |
| 4,634,134 | 1/1987 | Entrikin | 277/12 |
| 4,634,214 | 1/1987 | Cannon, Jr. et al. | 350/96.20 |
| 4,664,972 | 5/1987 | Connolly | 428/290 |
| 4,666,241 | 5/1987 | Caron | 350/96.21 |
| 4,689,005 | 8/1987 | Plummer | 425/451.9 |
| 4,689,184 | 8/1987 | Plummer | 264/1.5 |
| 4,711,752 | 12/1987 | Deacon et al. | 425/577 |
| 4,722,584 | 2/1988 | Kakii et al. | 350/96.20 |
| 4,738,507 | 4/1988 | Palmquist | 350/96.21 |
| 4,738,508 | 4/1988 | Palmquist | 350/96.21 |
| 4,741,590 | 5/1988 | Caron | 350/96.21 |
| 4,750,877 | 6/1988 | McFarlane | 425/577 |
| 4,834,487 | 5/1989 | Abendschein et al. | 350/96.20 |
| 4,867,525 | 9/1989 | DiMarco et al. | 350/96.20 |
| 4,925,266 | 5/1990 | Huebscher et al. | 350/96.20 |
| 4,942,009 | 7/1990 | Ohshima | 264/317 |
| 4,988,161 | 1/1991 | Fujikawa et al. | 350/96.20 |
| 4,994,134 | 2/1991 | Knecht et al. | 156/294 |
| 5,018,818 | 5/1991 | Barlow et al. | 350/96.2 |
| 5,034,170 | 7/1991 | Briggs et al. | 264/40.5 |
| 5,121,455 | 6/1992 | Palecek | 385/69 |
| 5,127,820 | 7/1992 | Briggs et al. | 425/577 |
| 5,243,673 | 9/1993 | Johnson et al. | 385/90 |
| 5,263,105 | 11/1993 | Johnson et al. | 385/72 |

FOREIGN PATENT DOCUMENTS

| | | |
|---|---|---|
| 0213315 | 3/1987 | European Pat. Off. . |
| 0506003 | 9/1992 | European Pat. Off. . |
| 4-261802 | 9/1992 | Japan . |
| 4-298315 | 10/1992 | Japan . |
| 87/01464 | 3/1987 | WIPO . |

*Primary Examiner*—Khanh P. Nguyen

[57] ABSTRACT

Apparatus for the preparation of optical ferrules containing cylindrical members is disclosed. The apparatus utilizes guide means receiving the cylindrical member, a sleeve receiving a piston therethrough, and a pin extending into the sleeve. The apparatus also includes biasing means to position the piston, fill gates to dispense polymer into a defined cavity, and containment means which secure the apparatus components together. Injection molded optical fiber ferrules made according to the apparatus and process disclosed exhibit superior properties.

9 Claims, 9 Drawing Sheets

APPARATUS FOR THE PREPARATION OF OPTICAL FERRULES

This is a continuation of application Ser. No. 07/984,796, filed Dec. 3, 1992, now abandoned.

FIELD OF THE INVENTION

The present invention relates to injection molded optical ferrules suitable for optical fibers, together with apparatus and processes for preparing such ferrules. More particularly, the present invention relates to injection molded optical ferrules exhibiting superior optical properties including low attenuation loss and low eccentricity and to apparatus and processes which produce ferrules having superior tolerances.

BACKGROUND OF THE INVENTION

Ferrules are secured to the ends of optical fibers to provide protection, and to enable the ease of use of optical fiber cables for the transmission of information via laser light energy. Ferrules provide the means for make-break connections, and to terminate the optical fiber transmission cables to sources, detectors, or to connect to other optical fiber cables. Optical fibers can be divided into two groups, the first, a multimode optical fiber that transmits laser energy of multiple laser modes, and the second, a single mode optical fiber that transmits a single laser mode or frequency. The multimode optical fiber is more easily connected to another optical fiber as the core of the multimode optical fiber is larger and tolerances to match two multimode optical fibers is much less restrictive than it is to connect two single mode optical fibers where the core of the optical fiber is much smaller. Thus the single mode optical fiber needs to be much more precisely aligned in order to obtain the equivalent transmission losses when compared to a multimode optical fiber. However, a single mode optical fiber is preferred over a multimode fiber when large amounts of information need to be transmitted.

Ceramic has been the preferred material for ferrules used with a single mode optical fiber. Ceramic ferrules can be made with tight tolerances on diameter, roundness, and concentricity of the location of the hole to hold the optical fiber. Currently, the method for manufacturing a ceramic ferrule includes the forming of the ceramic ferrule in the green state, firing the ceramic, lapping or polishing the hole to a given diameter within certain tolerances, grinding or lapping the outer diameter to within certain tolerances of diameter and concentricity of the axis of the hole all of which is time consuming and expensive. Often to achieve tight tolerances, ferrules are individually selected to match a particular optical fiber. The ceramic material has many beneficial properties. It is tough, hard, can be polished, has excellent wear resistance for insertion into sockets. However, it also has some limitations. The hole for the optical fiber is fixed and since optical fibers also have a range of diameters, due to tolerances of manufacture, only optical fibers with a smaller diameter than the hole in the ferrule can fit inside a given diameter hole in a ceramic optical ferrule. The difference between the optical fiber diameter and the diameter of the hole in the ceramic ferrule will add to the eccentricity of the optical fiber from the center axis of the ceramic ferrule, resulting in greater loss of light energy in connections. This has been partially overcome by selecting ceramic ferrules to match optical fibers. Other approaches have been used; however, all result in additional manufacturing steps and increased cost to insure low loss connections of optical fibers.

Thus a need exists for an optical ferrule that can be easily manufactured and requires no individual selection to achieve a low loss optical fiber connection. Injection molding processes offer ease of manufacturing. Patents which illustrate molded plastic ferrules include U.S. Pat. Nos. 4,330,171 and 4,942,009. Also see, for example, U.S. Pat. No. 4,531,702 which describes a three-part mold set for which concentricity and axial location of the mold parts is effected by directing a mold closing force along the common axis of the parts. Injected molded ferrules have not been uniform enough in roundness, or concentricity to be used as low loss optical ferrules for single mode optical fibers. Also, some of the other traditional problems of injection molding have also been hard to overcome, such as part shrinkage that results in large variations in dimensions. However, previous attempts to make optical ferrules have not resulted in tight tolerance ferrules that are sufficient to be used for low loss single mode optical fiber connectors.

The present invention overcomes many of those limitations and provides an injection molded plastic ferrule retaining most of the advantages of a ceramic ferrule, and providing some additional benefits at reduced cost. Thus, the purpose of the present invention is to provide an injection molded plastic ferrule for use with single and multimode optical fibers that requires tight tolerances on diameter, roundness, and concentricity of hole to outer diameter for use with a typical manufactured variance of diameter of optical fibers. Another purpose is to provide a pigtailed optical fiber ferrule composition with tight tolerances on diameter, roundness, and concentricity of the center of the optical fiber to the diameter of the ferrule that can be polished in a "factory" and used in a connector assembly for field installation to the end of an optical fiber cable via a splicing device in the assembly to insure dependable low loss field installed optical fiber connectors.

SUMMARY OF THE INVENTION

There is disclosed and claimed herein apparatus for the preparation of an optical ferrule containing a cylindrical member therein comprising:

(a) guide means having first and second ends and a center line and an aperture formed along the center line, wherein the cylindrical member is received along the aperture;

(b) a sleeve receiving a piston therethrough, the piston having first and second ends and a center line and an aperture formed along the center line, the first end located sufficiently close to the second end of said guide means when the apparatus is in a first position, so that the first end of the piston receives the cylindrical member along the aperture of the piston;

(c) a pin extending into the sleeve and having a first end in contact with the second end of the piston and having a hole formed therethrough for receiving the cylindrical member and positioning means attached to a second end of the pin;

(d) biasing means engaging the positioning means, the biasing means exerting a force sufficient to position the piston in (b) in the first position;

(e) one or more fill gates positioned equidistant from one another and for dispensing polymer at a uniform pressure and flow into a cavity defined by the second end of the guide means, the sleeve and the first end of the piston, and containment means (f); and (f) containment means configured to secure (a)–(e) in position relative to each other; and further wherein the piston of (b) is movable to a second position as polymer is dispensed through the fill gates (e) to form the optical ferrule within the cavity.

The cylindrical member in one embodiment of the invention is an optical fiber. The cylindrical member in another embodiment is a removable core pin.

In addition, the present invention features an injection molded optical ferrule exhibiting an attenuation loss of less than or equal to 0.5 dB and/or an eccentricity of less than about 0.5 microns. The optical ferrule is either an injection molded optical fiber ferrule or an injection molded optical fiber ferrule containing an optical fiber.

There is also disclosed and claimed herein a process for the preparation of an optical ferrule containing a cylindrical member.

DETAILED DESCRIPTION OF DRAWINGS

DESCRIPTION OF THE INVENTION

Figure 1A:
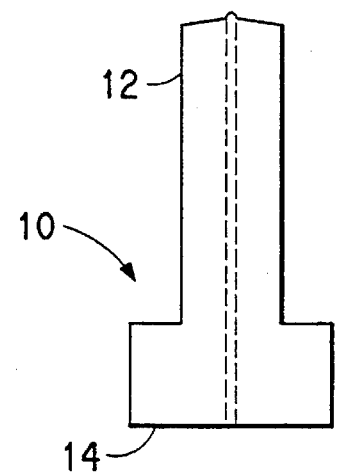
FIG. 1A is a side view of a ferrule according to the present invention as a clone.
Figure 1B:
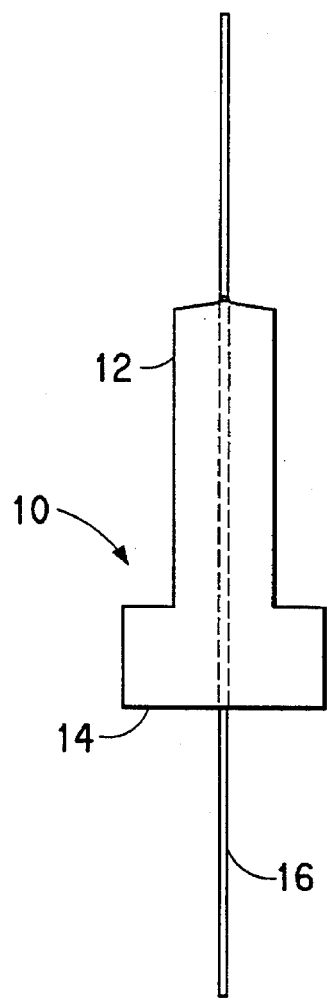
FIG. 1B is a side view of a ferrule with an optical fiber according to the present invention.
Figure 1C:
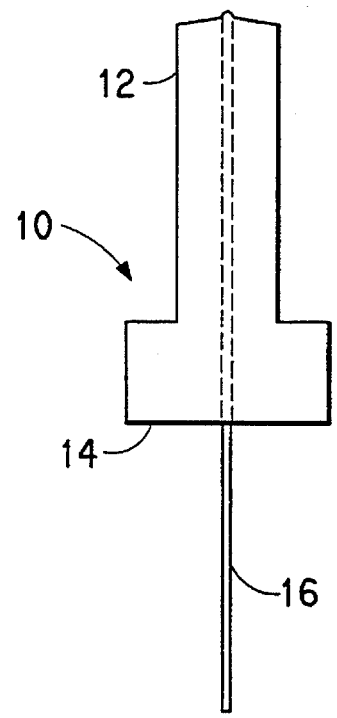
FIG. 1C is a side view of a ferrule with an optical fiber according to the present invention and with a polished first end.

The injection molded ferrule is shown in FIGS. 1(A)–1(C). The ferrule 10 has a smaller diameter first end 12 and a larger diameter second end 14. FIGS. 1A and 1B depict the ferrule after it is removed from the mold and separated from the gates and sprue. FIG. 1C shows a ferrule with an optical fiber 16 either inserted after molding a clone or molded into the ferrule and having the first end polished. These latter two are known as pigtailed optical fiber ferrules. This is achieved by either taking a ferrule 10 with an optical fiber 16 already molded in or by inserting a fiber 16 into the ferrule 10, by a method described herein, and then cleaving the fiber 16 so that a short section of the fiber 16 extends beyond the first end 12 and polishing the optical fiber 16 and the ferrule 10 to the rounded shape shown in FIG. 1C.

While this invention includes an injection molding apparatus, the following will only include those steps, procedures and tooling, that are unique or different from what is believed to be standard art in the injection molding field. The injection molding process is well known and widely practiced with many skilled and specially skilled persons. It is understood that there are many different approaches to the design and building of the mold set, and operations of the injection molding machine. The particular mold plates selected, the means of operating the mold set, the assembly, and control system all depend upon the skilled craftsman's knowledge of his particular equipment. While the following description provides detail particular to the mold equipment depicted in the drawings, it is to be appreciated that the invention includes other equipment designs.

Figure 2:
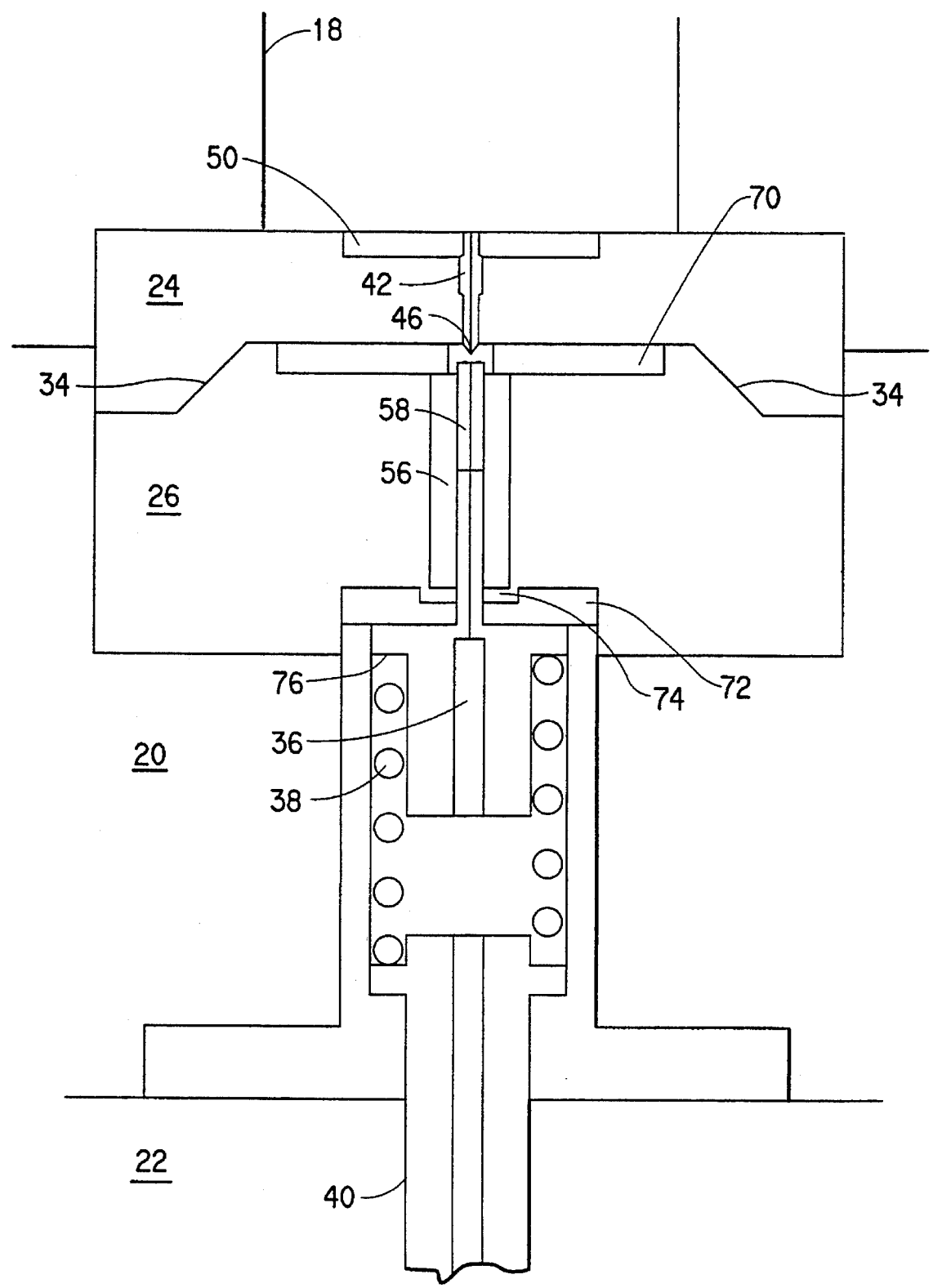
FIG. 2 is a schematic view of the molding die set of the present invention.
Figure 4:
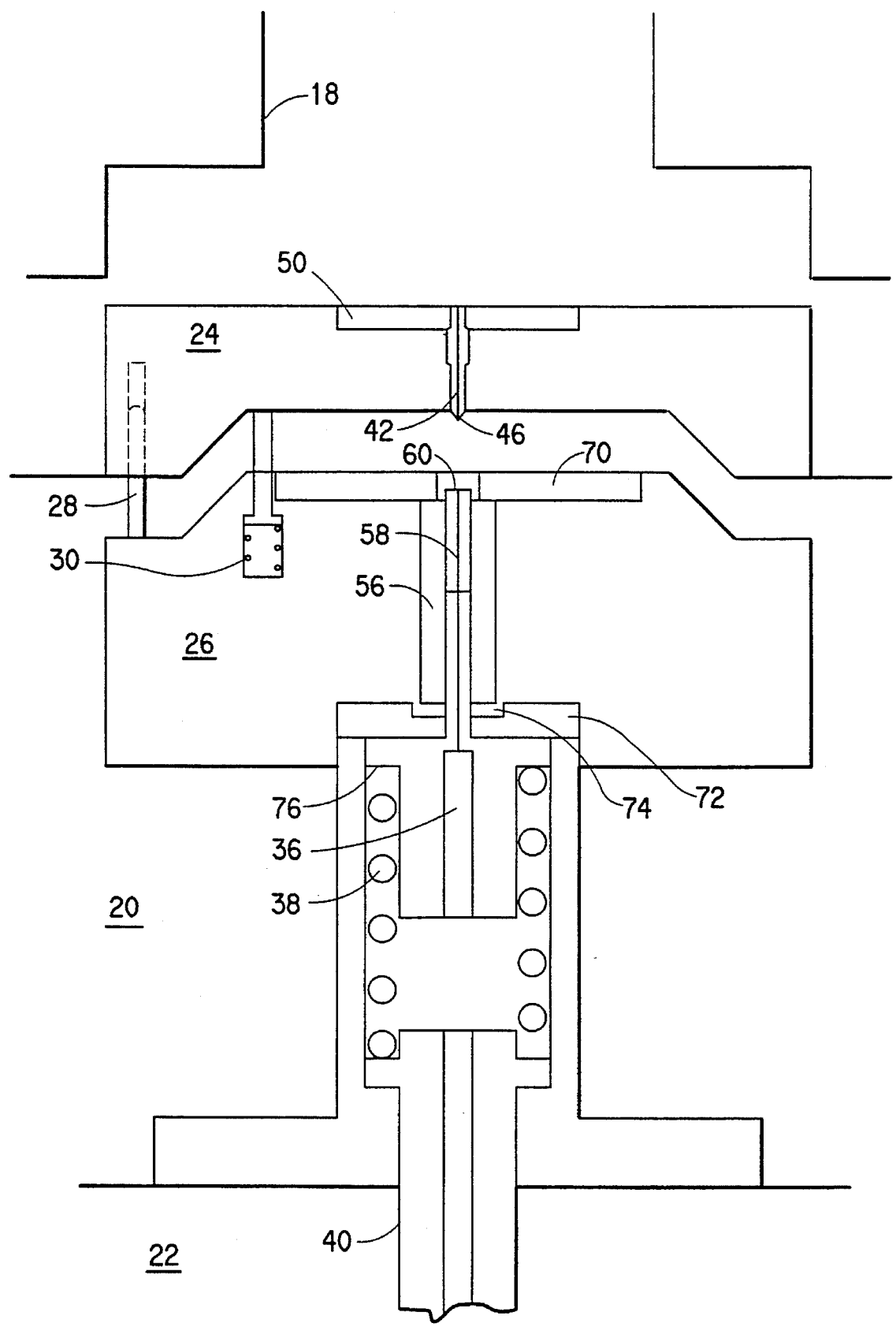
FIG. 4 is a schematic view of the apparatus of the present invention depicting the beginning of the mold cycle.
Figure 7:
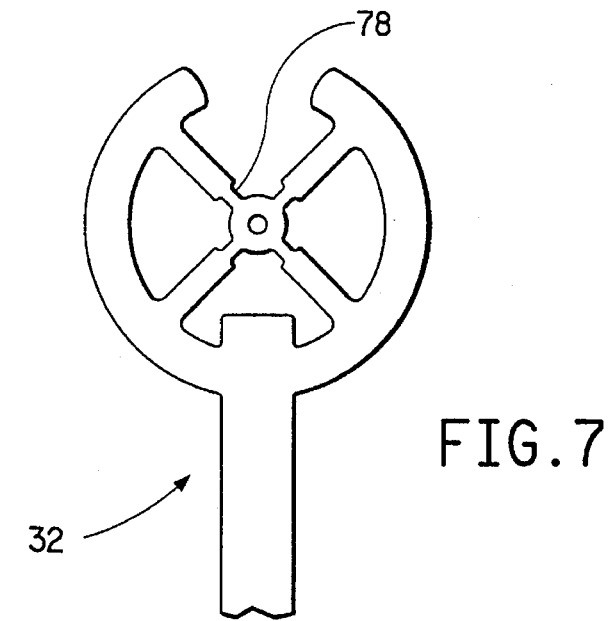
FIG. 7 is a top view of the sprue and gate system used in the apparatus of the present invention.

Having reference to FIG. 2, the molding die set consists of first plate 18, second plate 20, and third plate 22. Plates 18 and 20 open during the molding process to an open position to give access to two slugs that contains the molding cavity. Attached to the plate 20 is slug 26. Slug 24 which first mates up to the slug 26 by alignment pins 28 (as seen in FIG. 4) is pushed away from the slug 26 by springs 30 (as seen in FIG. 4) contained within the slug 26 when plates 18 and 20 are in the open position. When plates 18 and 20 are in the closed position, slugs 24 and 26 are forced together. The plane between slugs 24 and 26 form the parting plane and the gates and sprue assembly 32 (as seen in FIG. 7) for the flow of injected molded polymer are located along this parting plane. The slugs 24 and 26 are precisely aligned by the conical surfaces 34 jig bored as shown in FIG. 2 to provide alignment to less than ±0.0025 mm. The slugs 24 and 26 house the unique tooling to form the cavity. The rest of the plate 20 holds the knock-out pin 36, a spring 38 to apply force to the knock-out pin 36, a hydraulic pusher pin 40 to push the knock-out pin 36 and other ordinary components necessary for any standard injection molding process. The plate 22 encloses the rest of the working parts of the mold. The mold set chosen is capable of multicavity operation, however, only one cavity will be shown and explained as the others would be similar.

Figure 3:
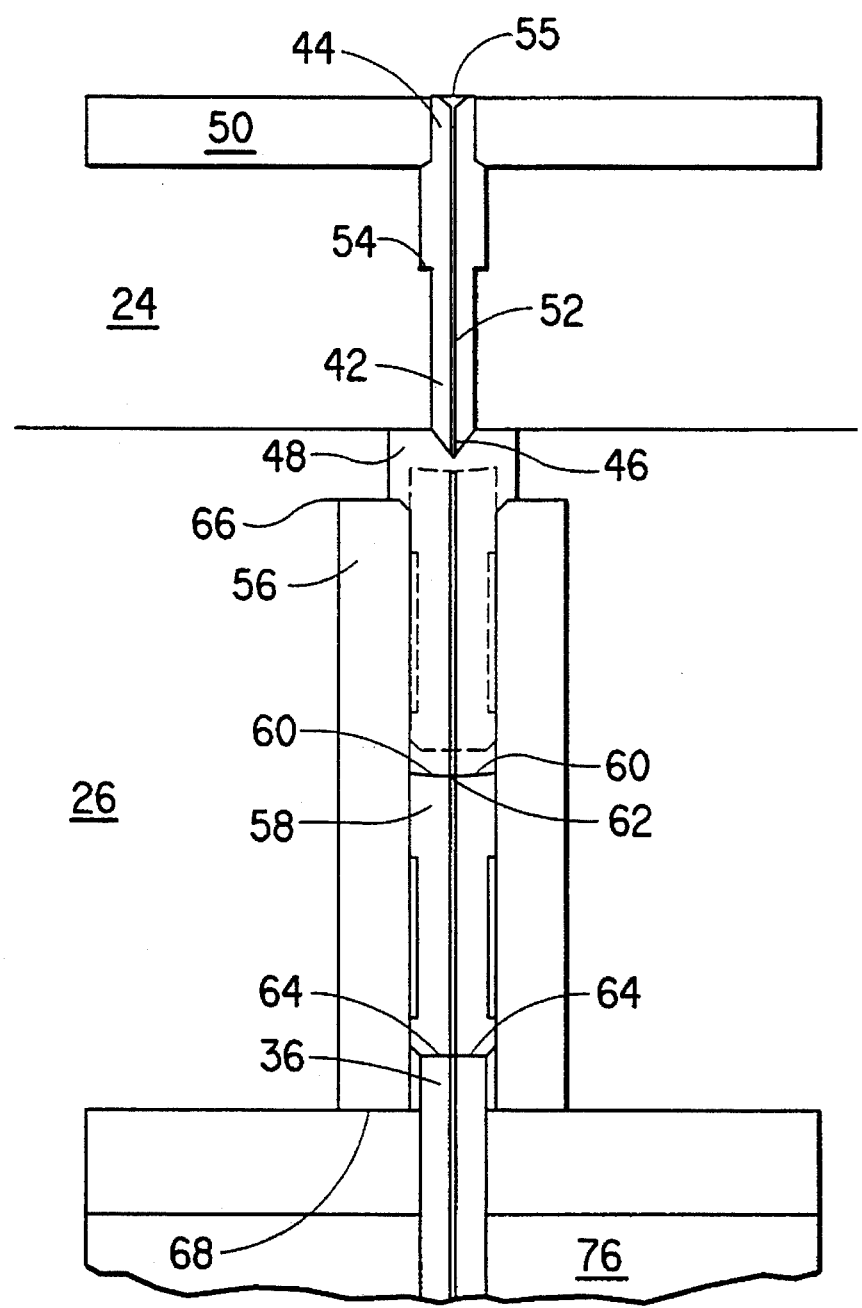
FIG. 3 is a schematic view of the apparatus of the present invention illustrating the positioning of the ceramic piston.

The molded ferrule has a center axis formed by the center axis of the cavity. Having reference to FIG. 3, slug 24 provides along the center axis a guide tube with a hole along the axis. The guide tube 42 has a first end 44 and a second end 46 and is inserted into slug 24 as shown in FIGS. 2 and 3, extending from the outside surface of slug 24 into the cavity 48, with the first end 44 held in place by a plate 50 attached to the outside surface of slug 24. The second end 46 of the guide tube 42 extends from the slug 24 toward the first inner surface of slug 26. The hole 52 centered in the guide tube 42 from the first end 44 to the second end 46 along the center axis is lapped to 0.1346 mm inner diameter and both ends 44 and 46 of the hole 52 are beveled out to 0.1524 mm inner diameter. The outer diameter of the guide tube 42 is ground to 2.500 mm and includes a step of 0.1956 mm as shown, from a precision ceramic ferrule. The outer diameter is ground to have the step 54 so that it can be inserted to a given depth and be located by a change in diameter of a hole in the slug 24 along the center cavity axis. The second end 46 extending toward slug 26 has been ground to have a 60° conical shape back 0.508 mm as shown in FIGS. 2 and 3. An entrance cone 55 has been ground into the first end 44 for the hole of the guide tube 42 to enable easy insertion of optical fibers.

In slug 26, a hole is made along the cavity axis to receive a ceramic sleeve 56, a moving ceramic piston 58 and a moving knock-out pin 36. The moving ceramic piston 58 of length 8.89 mm is selected from a group of precision ceramic ferrules having tight tolerances on roundness (minimum out-of-roundness), hole diameter, and concentricity of hole center to outer diameter. Out-of-roundness is a measurement of the total change in diameter, from maximum diameter to minimum diameter, when the diameter is measured at all points around the circumference of a circular object. Concentricity is a measurement at the location of the centers of two true circles, in which the circles are defined using a least squares fits of the actual surfaces to measurable tolerances. Concentricity equals two times the eccentricity which is the distance between true geometric centers of an inner circular outline and an outer circular outline. Tolerance of a hole diameter is the permissible variation in diameter from a specified value, expressed in actual values. This can reflect out-of-roundness as well as uniform diameter change. The first end 60 of the piston facing the second end 46 of the guide tube 42 is ground concave to a depth of 0.254 mm in a hemispherical shape of radius 3.810 mm, and at the entrance to the hole on the first end a 3.810 mm wide 60° cone 62 is also ground and polished into the first end of the hole of the piston. A 0.1524 mm undercut is polished along the outer diameter for 5.334 mm, leaving the full diameter for 2.286 mm from the first end 60 and 1.270 mm from the second end 64 of the piston. After selecting and shaping the piston 58, a ceramic sleeve 56 of outer diameter 7.620 mm is lapped with a hole along its' center axis from its' first end 66 to its' second end 68, and so that the hole in the ceramic sleeve 56 is made to have a very close fit with the ceramic piston 58, of the order of 0.3 μm clearance. The ceramic sleeve 56 is of length 19.30 mm or about 2 times longer than the piston 58.

The ceramic sleeve 56 is inserted into a hole in slug 26. It is secured into slug 26 by means of a first removable plate, 70, on the first end of slug 26 toward plate 18, and on the second end toward plate 22 by means of a second removable plate, 72. Between the ceramic sleeve and the plate, 72, a shim means 74 is provided between plate 72 and the ceramic sleeve 56 to insure that the ceramic sleeve 56 is in contact with the first removable plate 70. The shim 74 is adjusted to provide enough compression and force so that when the mold is in operation no flash occurs along the parting line at the first end of the sleeve. Portions of the ceramic sleeve 56, the movable ceramic piston 58, the first removable plate 70 in slug 26, the inner surface of slug 24, and the extending part of the guide tube 42 form the walls of the cavity 48 for the molded ferrule as shown in FIG. 3. The ceramic piston 58 is free to move along the center axis of the cavity. The knock-out pin 36 extends from inside plate 20 into the ceramic sleeve 56 that can push or be pushed by the ceramic piston 58. As shown in FIG. 2, a spring 38 below the flange 76 of the knock-out pin 36 pushes the knock-out pin 36 toward the ceramic piston 58 until it is stopped in its' first position by the second removable plate 72 attached to slug 26. The pusher pin 40 could also be pushed by mechanical means as well as hydraulic pressure against the knock-out pin 36 and in turn against the ceramic piston 58 to the first position. The ceramic piston 58, the knock-out pin 36 and the pusher pin 40 can be moved and stopped in a first position. The ceramic piston 58 can push against the knock-out pin 36 until it is stopped in the second position and the pusher pin 40 stopped in its' second position. FIG. 3 shows the ceramic piston 58 in the second position in solid line and in the first position in dotted line. The knock-out pin 36 and pusher pin 40 control an adjustable range of movement for the ceramic piston 58 in the ceramic sleeve 56. This motion forms a cavity with a minimum volume and a maximum volume. The knock-out pin 36 has a hole in the center to receive the end of an optical fiber 16 or a core pin. In addition to the plate 20, holding the knock-out pin 36 and spring 38 providing force against the knock-out pin 36 toward the ceramic piston 58, and the hydraulic pusher that can supply additional force to push against the knock-out pin 36, it also contains the other features necessary for the normal or typical operation of the mold including pressure gauges, temperature gauges, means to open and close mold, hydraulics to provide force for the pusher and other moving parts, pins to align the plates. The third plate 22 encloses and completes the mold.

Referring to FIGS. 2–6 and the description of the unique features of this invention and knowledge of a standard injection molding process, the inventive process can now be described in a step by step description through one cycle of the molding process. The discussion will first describe the process for a pigtailed injected molded optical fiber ferrule. Then a second discussion will describe the process for a clone or an injection molded optical fiber ferrule without an optical fiber. This discussion will finish with the additional description of a method to install an optical fiber into a clone.

Pigtailed Injection Molded Optical Fiber Ferrule

In FIG. 4, the ceramic piston 56 has been brought to its initial position by the knock-out pin 36 being forced by the spring 38 and/or hydraulic pusher 40. This initial position has been set by the stop on the knock-out pin 36 and is adjusted so that when the mold closes, as shown in FIG. 2 and FIG. 3, the gap between the second end 46 of the guide tube 42 extend into the cavity below the inner surface of slug 24 and the first end 60 of the ceramic piston 58 is approximately 0.254 mm from the second end, 46 of the guide tube, 42. It is possible to adjust this gap over a wide range of distances from just touching to having the ceramic piston 58 in the second position before molding thus making the gap the entire length of the ferrule. The distance 0.254 mm was chosen to allow some bending of the optical fiber 16 as it moves from the guide tube 42 into the ceramic piston 58 due to any misalignment between the hole in the guide tube 46 and the hole in the piston 58. A closer alignment of the guide tube 46 to the piston 58 would permit a shorter gap including zero. Making the gap longer could result in more bending of the optical fiber 16 during the initial filling of the cavity with polymer, resulting in a ferrule with greater eccentricity. Also, the chances of breaking the optical fiber 16 increase with a larger gap. Time is taken for the mold to reach the mold operating temperature of approximately 115° C. At this temperature, the steel die set has expanded twice as much as the ceramic tooling so that the ceramic sleeve and the tool steel hole now have approximately 0.051 mm larger clearances than when the tooling was assembled when everything was at room temperature. However, the clearances between the ceramic piston 58 and ceramic sleeve 56 remain the same, since they both have the same coefficient of thermal expansion. With the mold open and slug 24 in position, a piece of optical fiber 16 of diameter that closely matches the hole diameter in the ceramic piston 58 (nominally 125 µm) is inserted into the guide tube 42 through the entrance cone 55 on the first end 44 of the guide tube 42 through the second end 46 of the guide tube 42 toward the first end 60 of the ceramic piston 58. Since there is an entrance chamfer 62 to guide the optical fiber into the center hole of the ceramic piston 58 and sufficient clearance inside the guide tube 42 to allow some side to side movement of the optical fiber 16 in the guide tube 42 in relationship to the ceramic sleeve 56, and ceramic piston 58 in combination along with the preset gap, the optical fiber 16 can be inserted into the piston hole with minimum bending and without breaking. The optical fiber 16 is pushed through the ceramic piston 58 and into the knock-out pin hole 76 (as seen in FIG. 3), which has been oversized to receive the optical fiber without restriction. The optical fiber 16 is pushed well into the hole 76. Then the mold is closed.

Figure 5:
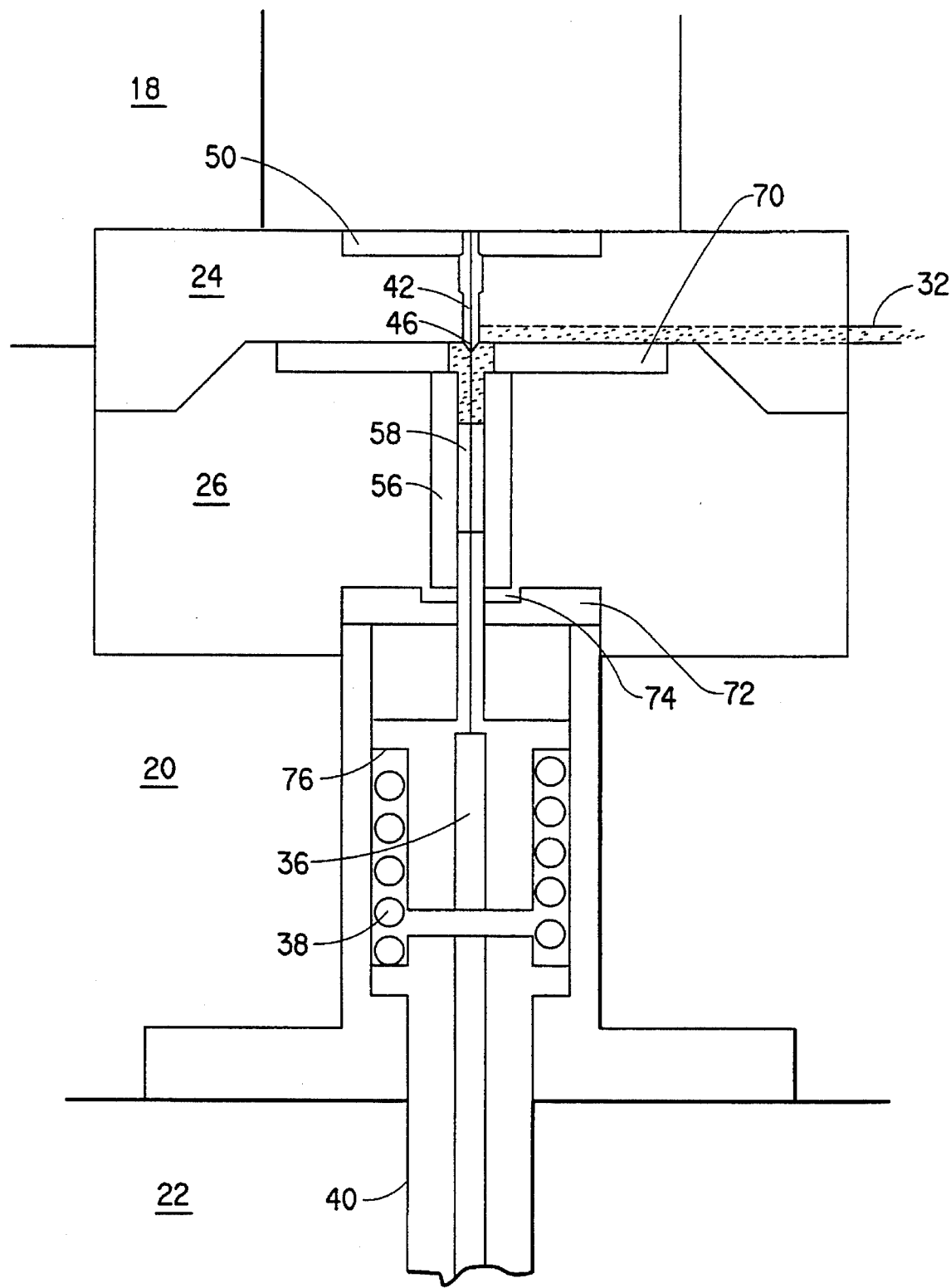
FIG. 5 is a schematic view of the apparatus of the present invention illustrating the dispensing of polymer into the mold cavity.
Figure 8A:
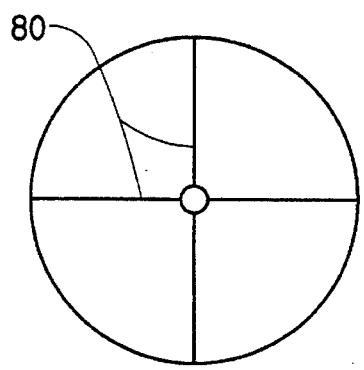
FIGS. 8A and 8B are cross sectional views of ferrules prepared using a balanced gate system and an unbalanced gate system, respectively.
Figure 8B:
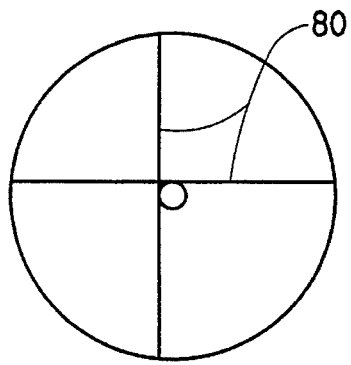

A composition at temperature of about 315° C. is forced with a barrel pressure of about 20,000 psi (1 psi=6.89476K pascal) into the cavity through a sprue and gate system as shown generally at 32 in FIG. 7. FIG. 5 shows that this gate system is cut into the first removable plate 20 on slug 26 on the parting plane side, while the runner is cut into both slug 24 and slug 26 on the parting plane, as well as along plates 18 and 20 on the parting plane. The gate system is designed to deliver to the cavity flow material so that at each gate entrance 78 the flow rate and pressures are equal and symmetric around the cavity. This is critical as uneven pressures and flows will result in a ferrule that has been made with more material flow and higher pressures from one gate compared to another. Viewing the cross sections of ferrules shows the knit lines. FIG. 8A shows the results from a balanced gate system, and FIG. 8B shows the results from an unbalanced gate system. The knit lines 80 are exactly centered for a balanced gate system. A balanced system is required to minimize the eccentricity of the center hole of the ferrule. Eccentric and out-of-round ferrules may be produced when using an unbalanced gate system resulting in higher loss optical ferrules; however, the centered knit lines provide a useful quality control.

Figure 6:
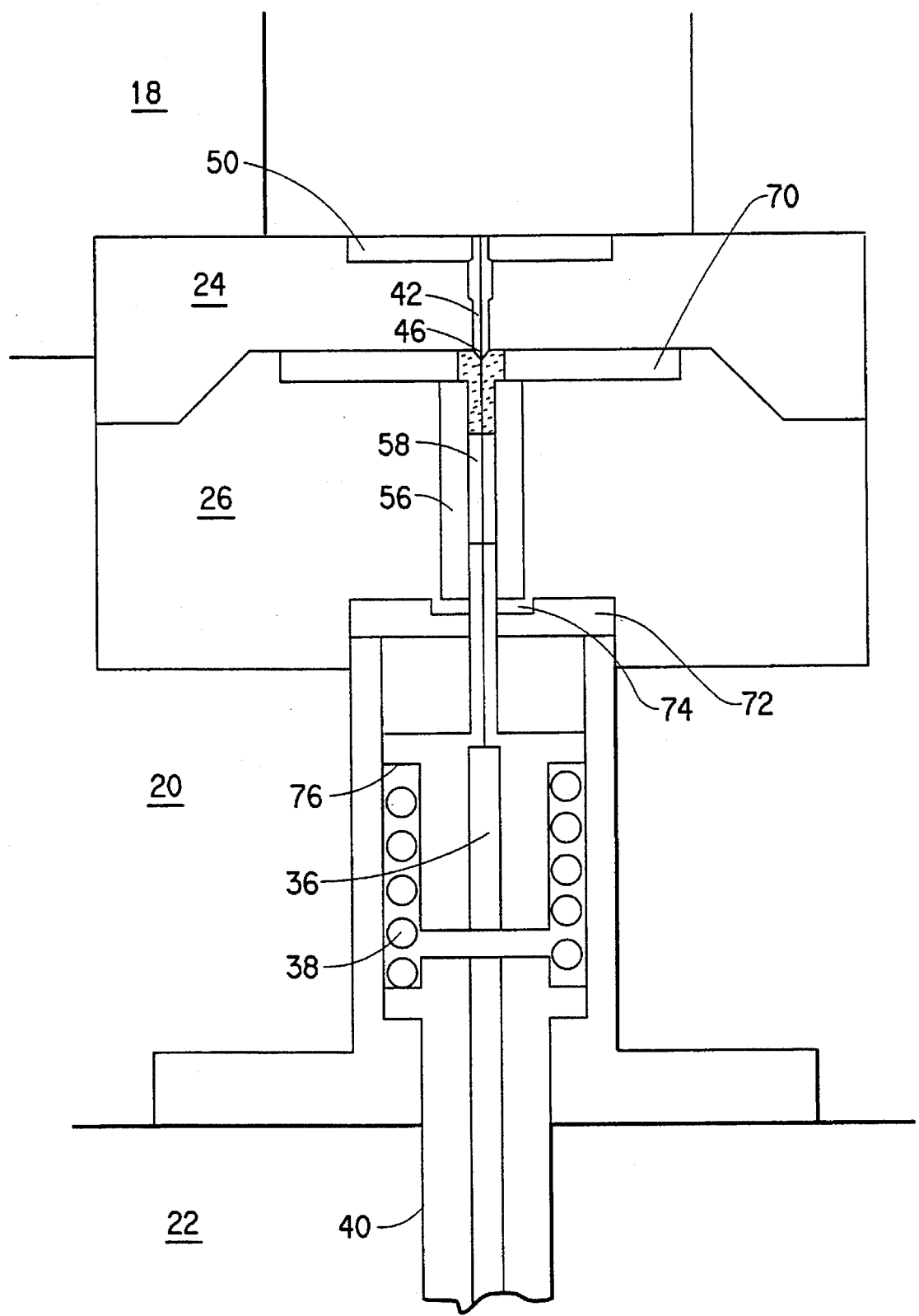
FIG. 6 is a schematic view of the apparatus of the present invention illustrating the piston in a second position after the polymer is dispensed.

Air is allowed to vent along the parting plane, with vents added as needed. Polymer fills the minimum cavity volume surrounding the optical fiber 16 in the small gap. The polymer pressure must build up to overcome the force of the spring 38 holding the ceramic piston 58 in its first position. This initial pressure is set by the spring 38. Springs with a range of initial forces of 5 lbsf (1 lbf=0.13255 Nt) to 50 lbsf were tested. For a spring with an initial spring force of 34 lbsf when the ceramic piston 58 is in the first position and a final spring force of 80 lbsf when the ceramic piston 58 is in the second position, the polymer pressure builds to 4,400 psi and overcomes the force of the spring of 34 lbsf and then the flowing polymer moves the ceramic piston 58 toward its second position pulling the optical fiber along. Polymer fills in behind, as shown in FIG. 5, and the pressure increases until the ceramic piston 58 stops at its second position when the knock-out 36 pin reaches the stopped pusher pin 40 as shown in FIG. 6. The pressure builds to the extruder barrel pressure, flow stops and the plastic cools down freezing at the gates. Once the gates freeze off, the barrel pressure no longer compresses the polymer. However the spring force on the knock-out-pin 36 continues. Shrinkage of the polymer is controlled by allowing the ceramic piston 58 to compress the plastic under load from the final spring force of 80 lbsf, or 10,000 psi to insure minimum shrinkage in the ferrule diameter. Also, the ceramic sleeve 56 can be selected to have a predetermined wall thickness that allows it to expand under the pressure load, and still not touch the steel walls in the mold tooling. The ability to expand the ceramic sleeve 56 proportionally to the applied force allows an additional method for diametrical control of the molded part. Final spring forces of 34 lbsf to 100 lbsf were tested. Additional force can be added from the hydraulic pusher 40 if necessary. Alternately a programmed hydraulic pusher could be used in place of the mechanical spring. The polymer is then cooled. The pigtail optical ferrule requires care in removing from the mold so as not to break off the optical fiber embedded in the ferrule. Thus it is preferred that when the mold is opened that the spring 36 and the hydraulic pusher 40 are used to push the ferrule out from the ceramic piston 58. Sprue hold on tabs help keep the ejected part attached to slug 24. The molded part is removed from slug 24. The ferrule is separated from the gate system. The mold is inspected and readied for another cycle. If pieces of optical fiber break off and locate in the piston, these can be pushed through the ceramic piston 58, the knock-out 36 pin and through the pusher pin holes.

Injection Molded Optical Fiber Ferrule or Clone

To make a clone optical ferrule the same procedure as described above is followed with the following exceptions. A core pin of the diameter that will make a hole in the ferrule slightly smaller than the optical fiber is used in place of the optical fiber. Core pins of a wide range of diameters can be used. The core pins can be selected in increments of 0.25 µm and for our purposes, we selected one of diameter 125.5 µm. The piston should also be selected so that the core pin matches the hole in the piston. Further upon separation of the gate system from the mold there is no concern about broken fibers.

It is preferable to make the hole in the clone, i.e., an injection molded plastic optical fiber ferrule without an optical fiber molded in, slightly smaller than the optical fiber to be used. A core pin is selected so that, after it is removed and the ferrule cooled to room temperature, the hole is too small to insert the optical fiber when the ferrule is at room temperature. The ferrule can be reheated (up to but less than glass transition temperature of the polymer composition used for the ferrule), to enlarge the hole enough to allow insertion of an optical fiber into the ferrule when the ferrule is warm and, when cooled back to room temperature, will lock the optical fiber in place. This provides a means to secure an optical fiber in the ferrule without using adhesive materials, e.g., epoxy materials, and insures that the fiber is centered in the hole. This is an advantage over ceramic ferrules that require clearance for insertion and adhesive to secure. This also eliminates the need to select a matched ceramic ferrule with a certain hole diameter to an optical fiber with a certain hole diameter in order to insure a close fit between them. A given clone ferrule can be used for a range of optical fiber diameters.

The optical fiber ferrule is now ready for cleaving the optical fiber extending from the first end of the ferrule and polishing the first end. Standard polishing techniques developed for ceramic ferrules can be used. An advantage of using a material softer than ceramic for the ferrule is that this softer polymer composition is easily polished away from the glass optical fiber and insures that the glass optical fiber becomes the center of the curved surface, while in a ceramic ferrule the polishing must also remove hard ceramic requiring a longer polish time. Also, since the polymer composition polishes more readily than the glass optical fiber, the polymer will polish back more quickly leaving the optical fiber to protrude a small distance from the polished polymer surface, which can be advantageous (see Denny Joseph E., Laser Focus World. August 1992, pp. 123).

The preferred polymer composition is an amorphous liquid crystal polymer (LCP) having a base resin as described in reference to Table II 40% filled with micro glass spheres and as provided in U.S. Pat. No. 4,664,972 incorporated by reference herein. The LCP has a $T_g$ of about 180° C. Other polymers could be used in this invention, however, this composition has preferred properties. The preferred properties of the molding composition include: low shrinkage in the mold, low coefficient of thermal expansion, high glass transition temperatures, and fillers with isotropic properties. Thermoplastic resins that are amorphous will have lower shrinkage than crystalline materials. Amorphous is used in the classical meaning, i.e., the polymer has no crystalline melting point, while crystalline means that the polymer has some regions of three dimensional order and a crystalline melting point. The higher the glass transition the better, since this leads to a lower coefficient of thermal expansion in general. Typically those polymers with a $T_g$ above 85° C. will provide a low thermal expansion. It is desirable to have an expansion coefficient lower than about 100 ppm. The preferred polymer has particular advantages in that it has low shrinkage in the mold. By adjusting the pressure on the polymer during cooling in the mold, the outer diameter of the optical fiber ferrule can be controlled to a tight tolerance.

Filler materials can be used to affect flow, shrinkage, and thermal expansion properties, as well as giving properties to the surface, such as wear characteristics and appearance. Isotropic fillers affect the composition more uniformly. Non-isotropic fillers like glass fibers give non-uniformities to both the final parts and to the molding process. The micro glass spheres chosen as the preferred filler have diameters from 2-12 µm, selected small in comparison to the optical fiber's outer diameter, other ranges could also have been used, including even a single diameter sphere. These provide an isotropic filler and provide a tough, wear resistant surface of minimum friction for insertion into connectors without further processing of the surface. The amount of loading of amount of the filler could be adjusted over a wide range from zero up to 70% or 80% providing the material composition flows well in the molding process and gives a performing final part. LCPs have some desirable properties such as low coefficient of thermal expansion, low viscosity at high shear rates typical of that found in injection molding, the ability to freeze off quickly when the mold cavity is filled and good filling conformation of small cavities. LCPs have been used in the past to make many small parts with tight tolerances and high definition of part shape including optical ferrules for multimode optical fiber uses. However, when tested in this invention traditional glass fiber filled LCPs were found to be less desired than the chosen preferred material. It is believed that other LCPs could benefit from using an isotropic filler including the glass sphere filling, and while they would still be a less preferred material for this invention, with proper adjustments in filling composition and molding parameters they may perform almost as well. Coloring agents like $TiO_2$ could be added to the uncolored polymer to make it look more like the ceramic ferrule; however, it is suggested that the uncolored polymer be used during set-up so that the knit lines, as shown in FIG. 8, can be observed for the adjustment of molding conditions as coloring agents could mask the knit lines. It is suggested that other polymer compositions with similar properties will give similar results and are contemplated in this invention.

Figure 9:
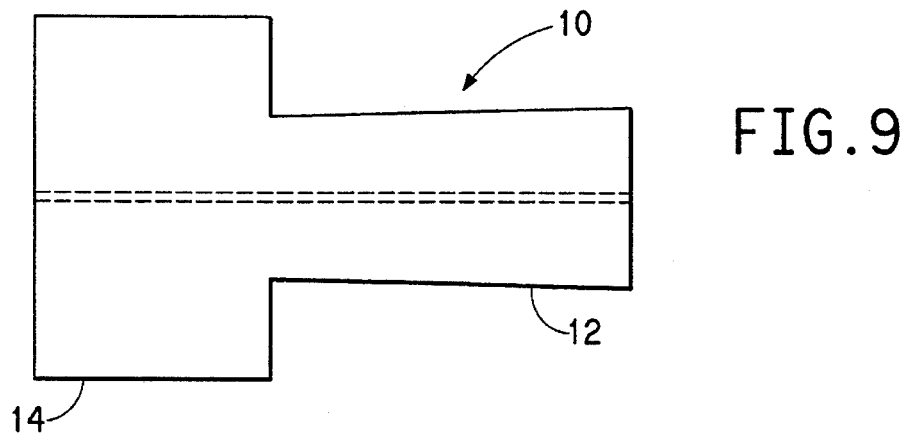
FIG. 9 is a ferrule according to the present invention.

An injection molded optical fiber ferrule made by this method and material has many advantages. A second shorter length of a ceramic sleeve with the same clearance for the ceramic piston can be used as a test sleeve and diameter gage. By sliding the ferrule into the test sleeve, the outer diameter of the ferrule can be determined and compared to molding conditions. The outer diameter of the ferrule can be controlled by adjusting the molding conditions to provide a tight or loose fit into the test ceramic sleeve. In this invention, the diameter of the shank of the ferrule at the first end, which is where the alignment is required can be controlled to less than ±0.5 µm. There is also a slightly reduced diameter at the second end just before the cap, as shown in FIG. 9, exaggerated.

Figure 10A:
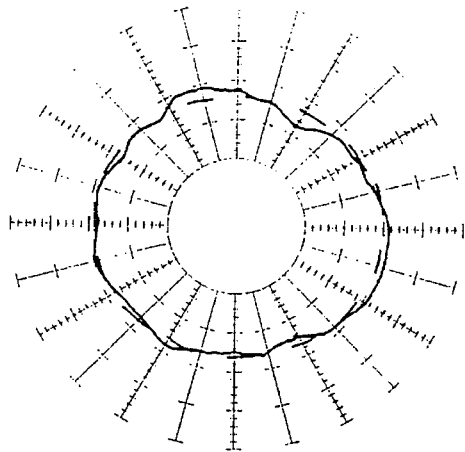
FIG. 10A shows out-of-roundness for a ceramic ferrule.

The out-of-roundness can be measured to ±0.1 µm using a Federal Series 300 Form Scan Instrument. FIG. 8A shows the knit line when the gates are balanced and 8B shows the knit lines when the gates are unbalanced. Note that for both ferrules, each of the four quarter sections correspond to the four gates. The measured values of out-of-roundness are: for a ceramic ferrule 0.54 µm, FIG. 10A; for the above mentioned preferred material with balanced gates, 0.64 µm, FIG. 10B; and for the preferred material with unbalanced gates, 2.2 µm, FIG. 10C. (Note that FIG. 10C is at a different scale than 10A and 10B.) In addition to gate design, the roundness depends on material selected, for example, using a non-preferred material, VECTRA™ B230, a polymer composition sold by Hoechst Celanese Corporation, results in a ferrule with measured value of out-of-roundness of 2.4 µm as shown in FIG. 11.

Figure 12:
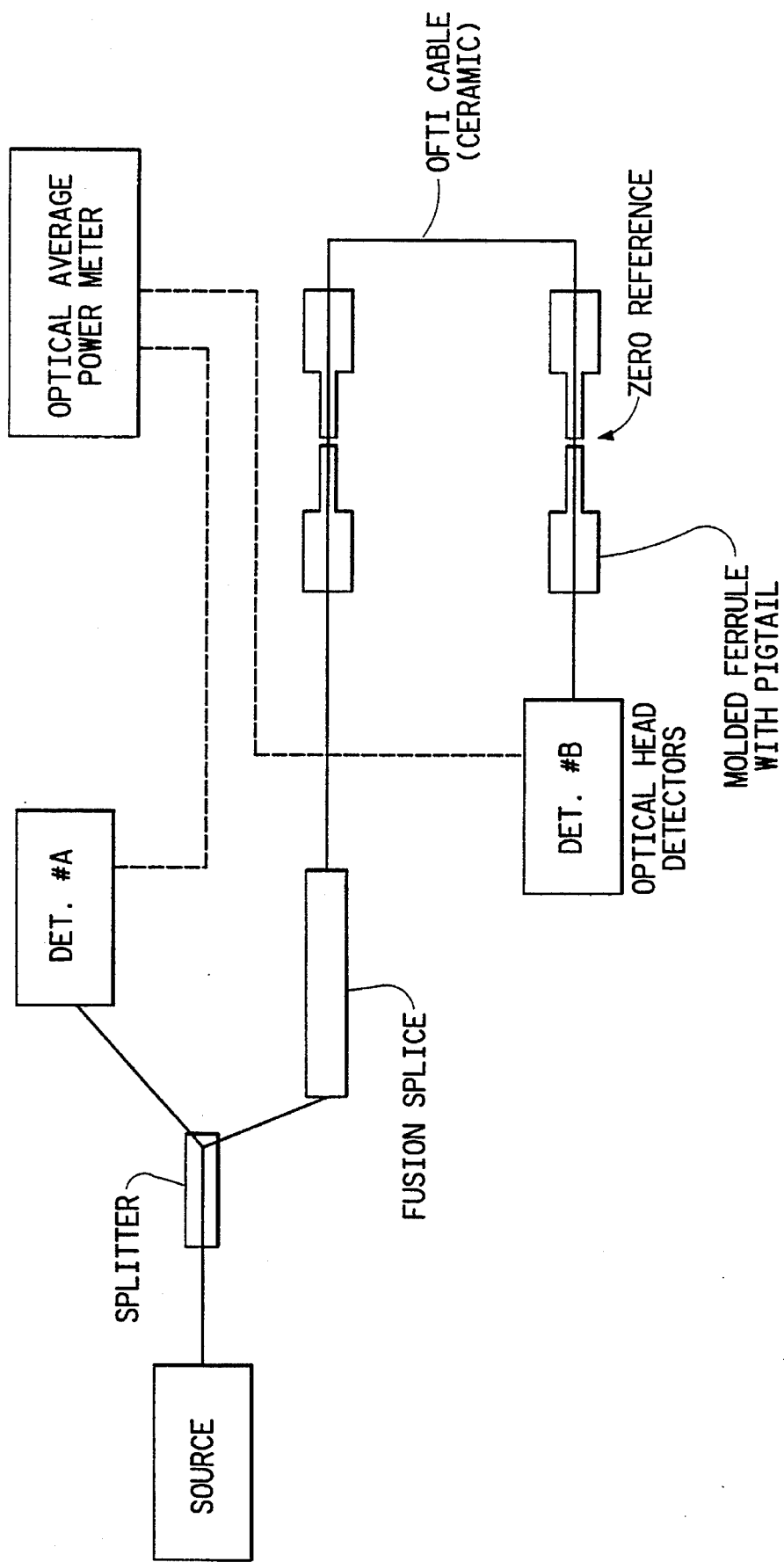
FIG. 12 is a schematic representation of an optical coupling test set-up.

The performance of the optical fiber ferrules can be measured by use of a test system as shown in FIG. 12. By inserting the test ferrule into a socket mating against a low loss ceramic ferrule, the optical loss can be measured. By rotating the test ferrule by 90° increments and then remeasuring the optical loss, a performance test profile can be obtained for each ferrule.

Table 1 gives the results for 21 pigtailed ferrules made with this invention. The average loss was 0.26 dB with a standard deviation of 0.18 db.

TABLE I

Optical Loss in Test Connectors
Pigtailed Ferrules of the Preferred Material

| Average dB Loss | dB Loss in Bulk-head Union | | | | |
|---|---|---|---|---|---|
| | 0° | 90° | 180° | 270° | 360° |
| 0.12 | 0.11 | 0.25 | 0.14 | 0.02 | 0.09 |
| 0.29 | 0.14 | 0.39 | 0.34 | 0.18 | 0.39 |
| 0.22 | 0.27 | 0.07 | 0.13 | 0.37 | 0.26 |
| 0.13 | 0.09 | 0.11 | 0.16 | 0.19 | 0.08 |
| 0.14 | 0.24 | 0.03 | 0.03 | 0.16 | 0.22 |
| 0.12 | 0.02 | 0.04 | 0.38 | 0.17 | 0.01 |
| 0.21 | 0.34 | 0.15 | 0.05 | 0.14 | 0.36 |
| 0.36 | 0.34 | 0.43 | 0.30 | 0.35 | 0.40 |
| 0.07 | 0.10 | 0.14 | 0.01 | 0.04 | 0.06 |
| 0.23 | 0.18 | 0.19 | 0.23 | 0.38 | 0.19 |
| 0.23 | 0.12 | 0.29 | 0.47 | 0.04 | 0.23 |
| 0.34 | 0.29 | 0.40 | 0.58 | 0.26 | 0.19 |
| 0.42 | 0.41 | 0.51 | 0.27 | 0.44 | 0.48 |
| 0.28 | 0.24 | 0.11 | 0.22 | 0.66 | 0.16 |
| 0.15 | 0.28 | 0.16 | 0.03 | 0.05 | 0.23 |
| 0.33 | 0.34 | 0.38 | 0.29 | 0.26 | 0.38 |
| 0.25 | 0.41 | 0.33 | 0.31 | 0.04 | 0.17 |
| 0.06 | 0.16 | 0.07 | 0.01 | 0.03 | 0.03 |
| 0.49 | 0.22 | 0.82 | 0.74 | 0.24 | 0.44 |
| 0.47 | 0.55 | 0.54 | 0.56 | 0.48 | 0.20 |
| 0.17 | 0.04 | 0.22 | 0.22 | 0.15 | 0.21 |

TABLE I-continued

Optical Loss in Test Connectors
Pigtailed Ferrules of the Preferred Material

| Average dB Loss | dB Loss in Bulk-head Union | | | | |
|---|---|---|---|---|---|
| | 0° | 90° | 180° | 270° | 360° |
| 0.30 | 0.22 | 0.29 | 0.56 | 0.35 | 0.10 |
| 0.48 | 0.41 | 0.28 | 0.46 | 0.75 | 0.52 |

21 Samples AVERAGE = 0.26
116 Tests STD DEV = 0.18

The concentricity can be calculated from this data. The power loss measurements and eccentricity relationships are given by dB Loss=0.2 (eccentricity)$^2$; Eccentricity=(dB Loss 0.2)$^{0.5}$; Eccentricity of ferrule=(Minimum Eccentricity+Maximum Eccentricity) 2; and, Eccentricity of source= Maximum Eccentricity−Eccentricity of ferrule. Using the minimum value of optical loss and the maximum value of optical loss during a rotation of the test optical fiber gives a value for the Eccentricity of ferrule, and also for the source. Using these relationships and the data above, as well as data from other test moldings, the following eccentricity values are calculated as shown in Table II. For groups H, GS1 and GS2 the base resin has the following components (and molar ratios): t-butyl hydroquinone (26.7); 4,4'-dihydroxydiphenyl (6.7); terephthalic acid (33.3); and parahydroxybenzoic acid (33.3). This is prepared according to U.S. Pat. No. 4,664,972.

TABLE II

Optical Loss in Test Connectors Various Materials

| Group # | # of Tests | Material (comments) | Diameter in μ tip s/90° | dB Loss in B/H Bulk-head Union meas. made at 0°, 90°, 180°, 270° | Eccentricity in μm |
|---|---|---|---|---|---|
| B | 40 | VECTRA™ B-230 (LCP) | 2499/2501 | Avg. 1.06 Std. Dev. 0.73 | Avg. 2.13 μm |
| H | 35 | 70% base resin 30% talc (LCP) | 2494/2501 | Avg. 0.83 Std. Dev. 0.34 | Avg. 2.04 μm |
| GS1 | 144 | 62% base resin 35% glass spheres 3% TiO$_2$ (LCP-balanced gates) | 2500/2500 | Avg. 0.23 Std. Dev. 0.17 | Avg. 0.95 μm |
| GS2 | 108 | 62% base resin 35% glass spheres 3% TiO$_2$ (LCP-unbalanced gates) | 2499/2500 | Avg. 0.40 Std. Dev. 0.26 | Avg. 1.34 μm |

Figure 10B:
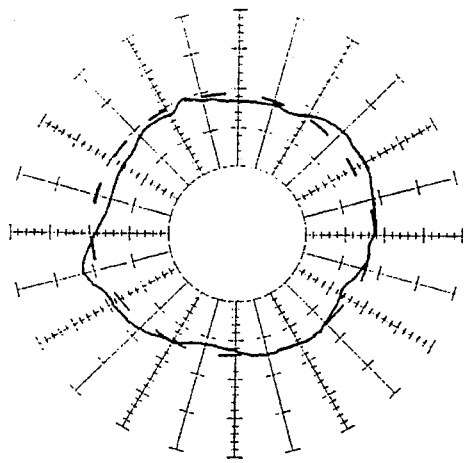
FIG. 10B shows out-of-roundness for a plastic ferrule using a balanced gate system.
Figure 10C:
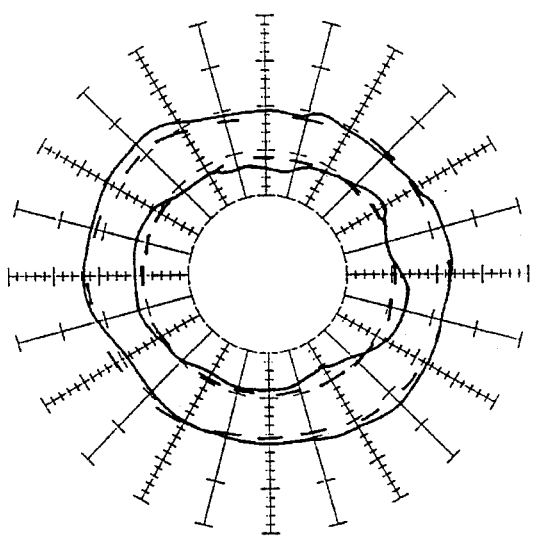
FIG. 10C shows out-of-roundness for a plastic ferrule using an unbalanced gate system.
Figure 11:
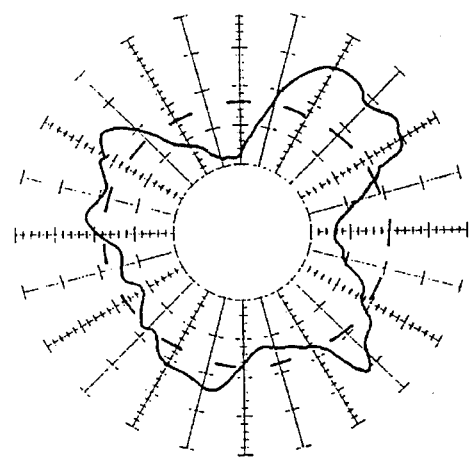
FIG. 11 shows out-of-roundness for a ferrule of a specific material, VECTRA™ B230.

A part from Table II group GS1 was used for the graph in FIG. 10B.

A part from Table II group GS2 was used for the graph in FIG. 10C.

A part from Table II group B was used for the graph in FIG. 11.

For ferrules that have out-of-roundness greater than 1 μm as shown in FIG. 10C or 11, a greater eccentricity and greater optical losses can be expected as shown in Table II or Table III.

TABLE III

Optical Loss in Test Connectors
Cloned Ferrules of the Preferred Material
Function of Eccentricity

| Average dB Loss | dB Loss in B/H Union | | | | | (μm) Eccent | Source Eccent |
|---|---|---|---|---|---|---|---|
| | 0° | 90° | 180° | 270° | 360° | | |
| 0.31 | 0.14 | 0.26 | 0.53 | 0.28 | 0.36 | 1.23 | 0.40 |
| 0.06 | 0.06 | 0.01 | 0.01 | 0.19 | | 0.60 | 0.38 |
| 0.06 | 0.07 | 0.02 | 0.07 | 0.11 | 0.03 | 0.53 | 0.21 |
| 0.15 | 0.03 | 0.12 | 0.21 | 0.28 | 0.10 | 0.79 | 0.40 |
| 0.47 | 0.43 | 0.66 | 0.34 | 0.24 | 0.68 | 1.47 | 0.37 |
| 0.22 | | | | | 0.22 | | |
| 0.55 | 0.70 | 0.80 | 0.53 | 0.38 | 0.34 | 1.65 | 0.35 |
| 0.25 | 0.33 | 0.15 | 0.17 | 0.33 | 0.29 | 1.08 | 0.21 |
| 0.34 | 0.34 | 0.24 | 0.56 | 0.25 | 0.31 | 1.38 | 0.29 |
| 0.38 | 0.58 | 0.35 | 0.04 | 0.47 | 0.48 | 1.08 | 0.63 |
| 0.34 | 0.38 | 0.43 | 0.42 | 0.29 | 0.16 | 1.18 | 0.29 |
| 0.37 | 0.08 | 0.43 | 0.79 | 0.42 | 0.14 | 1.31 | 0.68 |
| (9 Parts, 108 Tests) | | Avg. Loss dB 0.40 Std. Dev. dB 0.26 | | | | 1.29 0.35 | |

Performance of the ferrules made by this invention can be compared to commercially available ferrules. Plastic multimode ferrules commercially available were obtained and tested in the set up shown in FIG. 12. (No commercial single mode plastic ferrules are currently available.) Also ferrules were made with a non preferred material, VECTRA™ B230, as shown in FIG. 11, They were measured and the summary values are shown in the top of Table IV. Data was also taken from a catalog from AMP Incorporated, catalog #65393 showing two different levels of selecting ceramic ferrules for use with low loss single mode optical fibers. Ferrules made in the preferred mode with the preferred material were made and tested. No sorting of items to be tested was made beyond a quick visual inspection to insure that the optical fiber and ferrule were complete, not visibly damaged and could be tested. The results, on the bottom half of Table IV, show that the plastic ferrules made with this invention are at least as good in terms of performance as selected ceramic single mode ferrules.

TABLE IV

Optical Loss in Tests Connectors

Plastic Ferrule -- Single mode optical fiber

| Type | Optical loss for test setup | |
|---|---|---|
| Radient | Avg loss 5.59 dB | Std Dev 2.31 dB |
| AMP | Avg loss 8.22 dB | Std Dev 3.75 dB |
| VECTRA ™ B230 | Avg loss 4.09 dB | Std Dev 1.55 dB |
| Ferrule herein formed with core pin | Avg loss 0.32 dB | Std Dev 0.21 dB |

Ceramic -- Single mode optical fiber

| Type | Optical loss for test setup # tested with measured loss | | | | | | | | | |
|---|---|---|---|---|---|---|---|---|---|---|
| | 0.1 dB | 0.2 dB | 0.3 dB | 0.4 dB | 0.5 dB | 0.6 dB | 0.7 dB | 0.8 dB | 0.9 dB | 1.0 dB |
| AMP/Ofti #65393 Part #504006-X | 4 | 20 | 126 | 60 | 8 | | | | | |
| | Avg loss 0.28 dB | | | | Std Dev 0.07 dB | | | | | |
| AMP/Ofti #65393 Part #5040101-1 | 15 | 32 | 25 | 23 | 30 | 15 | 13 | 4 | 3 | |
| | Avg loss 0.35 dB | | | | Std Dev 0.20 dB | | | | | |
| Ferrule herein formed ("pigtail") | 43 | 29 | 31 | 18 | 11 | 8 | 1 | 2 | 1 | |
| | Avg loss 0.23 dB | | | | Std Dev 0.17 dB | | | | | |
| Ferrule herein formed with molded in core pin (clone) | 12 | 12 | 13 | 14 | 10 | 8 | 4 | 1 | | 1 |
| | Avg loss 0.32 dB | | | | Std Dev 0.21 dB | | | | | |

Those skilled in the art of injection molding will appreciate that the concentricity and outer diameter depend upon the quality of the tooling and the operation of the molding process. The injected molded ferrule cannot have better concentricity than the tooling. Thus the ceramic piston must be selected and measured for roundness. The ceramic sleeve must be fitted to the piston with minimum clearance. The location of the ceramic guide to the piston must be adjusted to be aligned to be close enough to allow the optical fiber (or core pin) to bridge the gap without breaking or bending and for the ceramic piston to control the location of the fiber at the first end of the ferrule. The polymer must be selected for proper properties. Most skilled in the art of injection molding expect to make trial runs changing pressures, temperatures, flow rates, gate sizes, etc., when making a precision part for the first time in order to optimize conditions for a specific molding system.

The preferred material can be post processed after molding by grinding and lapping in a manner similar to grinding and lapping ceramic materials. Thus additional features can be ground or lapped into the ferrule or any other similar injected molded part. This permits a single mold to be designed to produce ferrules where the cap end is modified to meet a particular feature requirement. A "capless" ferrule is contemplated in this invention where the ferrule becomes a cylinder with a concentric hole. Further processing of the cylinder to grind a slit would produce a split ring. For those skilled in the art further modifications should come to mind with the benefit of this invention.

For one skilled in the art, the above description and data show that an optical fiber ferrule can be made by an injection molding process that will produce a ferrule with an eccentricity roundness of less than 1 μm of the central axis and a nominal diameter at the first end of the ferrule of ±0.5 μm.

It is to be understood that a wide variety of modifications can be made to the present invention without departing from the spirit and the scope thereof. Such variations are claimed as the property and privilege of the invention herein.

What is claimed is:

1. Apparatus for the preparation of optical ferrule containing a cylindrical member therein comprising:

(a) guide means having first and second ends and a center line and an aperture formed along the center line, wherein cylindrical member is received along the aperture;

(b) a sleeve receiving a piston therethrough, said piston having first and second ends and a center line and an aperture formed along the center line, said first end located sufficiently close to said second end of said guide means when the apparatus is in a first position, so that said first end of said piston receives the cylindrical member along the aperture of said piston;

(c) a pin extending into said sleeve and having a first end in contact with said second end of said piston and having a hole formed therethrough for receiving the cylindrical member and positioning means attached to a second end of said pin;

(d) biasing means engaging said positioning means, said biasing means exerting a force sufficient to position said piston in (b) in the first position;

(e) one or more fill gates positioned equidistant from one another and for dispensing polymer at a uniform pressure and flow into a cavity defined by said second end of said guide means, said sleeve and said first end of said piston; and (f) containment means configured to secure (a)–(e) in position relative to each other; and further wherein said piston of (b) is movable to a second position as polymer is dispensed through the fill gates (e) to form the optical ferrule within said cavity.

2. The apparatus of claim 1 wherein the cylindrical member is an optical fiber.

3. The apparatus of claim 1 wherein the cylindrical member is a removable core pin.

4. The apparatus of claim 1 wherein said guide means (a) and said sleeve and piston of (b) are ceramic.

5. The apparatus of claim 1 wherein said aperture of said piston of (b) is cylindrical and has an eccentricity of less than about 0.3 microns and said piston has a clearance of less than about 0.1 microns to said sleeve.

6. The apparatus of claim 1 wherein said guide means (a) and said piston of (b) are located within about 0.25 mm of each other when the apparatus is in the first position, and further the center lines of said guide means (a) and said piston of (b) are substantially aligned.

7. The apparatus of claim 1 wherein the aperture of said guide means (a) further includes a first cone formed in the aperture at the first end of said guide means and a second cone formed in the aperture at the second end of said guide means.

8. The apparatus of claim 1 wherein four fill gates (e) are positioned 90 degrees from one another.

9. The apparatus of claim 1 wherein said biasing means is a spring, a hydraulic assembly, or a combination thereof.

* * * * *